L. CLINTON.
Straw Cutter.
No. 13,215.
Patented July 10, 1855.
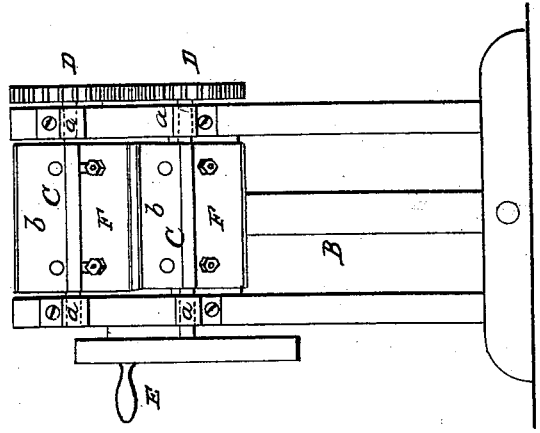
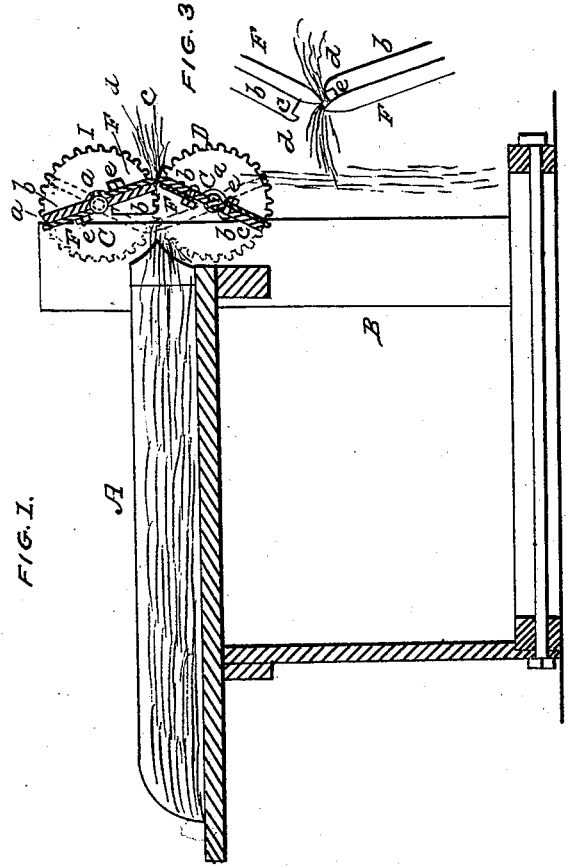

UNITED STATES PATENT OFFICE.

LYMAN CLINTON, OF NORTH HAVEN, CONNECTICUT.

STRAW-CUTTER.

Specification of Letters Patent No. 13,215, dated July 10, 1855.

*To all whom it may concern:*

Be it known that I, LYMAN CLINTON, of North Haven, in the county of New Haven and State of Connecticut, have invented a new and Improved Straw-Cutter; and I do hereby declare that the following is a full, clear, and exact description of the same, reference being had to the annexed drawings, making a part of this specification, in which—

Figure 1, is a vertical longitudinal section of my improved straw cutter. Fig. 2, is a front view of ditto. Fig. 3, is an enlarged detached section of the cutters, showing their operation.

Similar letters of reference indicate corresponding parts in the several figures.

The nature of my invention consists in placing knives or cutters on two revolving winged arbors or shafts in such a way that the cutting edges of said knives or cutters as the arbors or shafts revolve, will pass closely to each other without interfering and operate like shears, the edges of the wings of the arbors or shafts having rabbets formed in them into which the edges of the cutters pass and thereby insure the perfect cutting of the straw, which as it is acted upon by the cutters rests upon the lip or ledge which forms the rabbet, as will be hereafter fully described.

To enable others skilled in the art to fully understand and construct my invention, I will proceed to describe it.

A, represents the feed box of the usual construction and supported by proper framing B.

C, C, represent two arbors or shafts which run in suitable bearings (*a*) on the front end of the feed box A. The arbors or shafts have each a gear wheel D, at one end, which wheels gear into each other. A crank E, is attached to the opposite end of one of the arbors or shafts. Each arbor or shaft is provided with two wings (*b*) attached to opposite parts of their peripheries so that the wings of each arbor or shaft will be in line with each other as shown in Fig. 1. The wings extend the whole length of the arbors or shafts or at least equal to the breadth of the mouth of the feed box, see Fig. 2. The edges of the wings have each a rabbet (*c*) cut in them leaving a lip or ledge (*d*) at one side.

To each wing (*b*) there is attached by set screws (*e*) a knife or cutter F. The knives or cutters are equal in length to the wings and their cutting edges project a trifle beyond the edges of the lips or ledges, (*d*), said knives or cutters being secured to the sides of the wings opposite to the lips or ledges (*d*) and a groove or recess is thereby formed between the cutting edge of each cutter and the lip or ledge opposite, see Figs. 1, and 3.

As the arbors or shafts rotate, the cutting edges of the knives or cutters F, pass each other without interfering similar to a pair of shears and pass into the rabbets (*e*) and cut the straw which as it is acted upon by the cutters rests upon the lip or ledge opposite the lower cutter. The lips or ledges support the straw and prevent it from yielding or giving as the cutters act upon it, thereby insuring the perfect cutting of the straw, see Fig. 3.

The straw is placed in the feed box and the cutters serve as feeders for while in the act of cutting they draw or pull upon the straw.

Although the arbors or shafts are described as having each two wings and cutters, still more may be used if desired.

I do not claim as new, placing knives or cutters on revolving winged arbors irrespective of the peculiar arrangement herein shown of the grooves or rabbets at the edges of the wings, but

What I claim as new and desire to secure by Letters Patent, is—

Placing knives or cutters F, on the wings (*b*) of two revolving arbors or shafts C, C, when the edges of said wings have rabbets (*e*) cut in them so as to form lips or ledges (*d*), opposite the cutting edges of the knives or cutters, for the purpose as herein shown and described.

LYMAN CLINTON.

Witnesses:
EVELYN BLAKSLEE,
SAMUEL BAILY.